United States Patent
Tsuchiya

(10) Patent No.: US 7,512,656 B2
(45) Date of Patent: Mar. 31, 2009

(54) VOICE CHAT SYSTEM

(75) Inventor: Kouji Tsuchiya, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 734 days.

(21) Appl. No.: 10/358,287

(22) Filed: Feb. 5, 2003

(65) Prior Publication Data

US 2004/0109023 A1    Jun. 10, 2004

(30) Foreign Application Priority Data

Feb. 5, 2002  (JP) ............................. 2002-028596
Feb. 3, 2003  (JP) ............................. 2003-026380

(51) Int. Cl.
*G06F 15/16* (2006.01)

(52) U.S. Cl. .................. 709/205; 709/204; 709/206; 709/207; 715/758

(58) Field of Classification Search ................. 709/203, 709/204–207; 715/758; 463/35, 42
See application file for complete search history.

(56) References Cited

U.S. PATENT DOCUMENTS

| | | | |
|---|---|---|---|
| 6,564,261 B1 * | 5/2003 | Gudjonsson et al. | 709/227 |
| 6,807,562 B1 * | 10/2004 | Pennock et al. | 709/204 |
| 2001/0044725 A1 * | 11/2001 | Matsuda et al. | 704/269 |
| 2002/0143876 A1 * | 10/2002 | Boyer et al. | 709/205 |

FOREIGN PATENT DOCUMENTS

| | | |
|---|---|---|
| JP | 02-048853 | 2/1990 |
| JP | 08-182053 A | 7/1996 |
| JP | 09-083655 A | 3/1997 |
| JP | 09-186773 A | 7/1997 |
| JP | 10-276280 | 10/1998 |
| JP | 11-319319 | 11/1999 |
| JP | 2001-149659 A | 6/2001 |
| JP | 2001-186279 A | 7/2001 |

* cited by examiner

*Primary Examiner*—Saleh Najjar
*Assistant Examiner*—Faruk Hamza
(74) *Attorney, Agent, or Firm*—Finnegan, Henderson, Farabow, Garrett & Dunner, L.L.P.

(57) ABSTRACT

An object of the present invention is to present a voice chat system suitable for networked games. The voice chat system of the present invention comprises a plurality of game apparatuses connected to a communications network and a server apparatus that manages voice chat between the game apparatuses. The server apparatus obtains from a game apparatus the IP address of the game apparatus which is to be the partner for the voice chat. The voice information inputted into the game apparatus is relayed over the IP network as a VoIP packet and is delivered to the chat partner's game apparatus via the server apparatus. Through this configuration, chat sounds are not outputted to all game apparatuses connected to the network but, instead, are outputted only to the game apparatuses specified by a player, so the object can be achieved without an increase in network traffic above what is necessary.

3 Claims, 6 Drawing Sheets

VOICE OVER IP PACKET FORMAT

VOICE CHAT SYSTEM

BACKGROUND

1. Field of the Invention

The present invention relates to voice chat techniques suitable for networked games.

2. Description of the Related Art

Techniques for connecting a plurality of game clients to a game server apparatus via a computer network and conducting networked games has been proposed in Japanese Patent Application Laid-Open Nos. H10-276280 and H11-319319. The forms of connecting networked games include the peer-to-peer system wherein players in remote locations compete one-on-one and the multi-player system wherein a large number of players play at once. Recently, with the advent of higher performance routers and WDM technologies, IP Telephony technology has progressed and "Voice over IP" has become possible, enabling the exchange of voice information over IP networks which previously had been used for data communication. It has thus become possible for players to talk to other players via voice chat while playing a networked game. Through realization of this voice chat, players can better communicate with other players, thus enabling greater enjoyment of networked games.

However, in conventional networked games, because the game server apparatus could not manage voice, chat between game clients, any voice information inputted by one of the game clients was outputted to all the game clients connected to the network. Moreover, if voice input was sent from a plurality of game clients, these voice inputs would be outputted simultaneously and the problem that would occur was that it could not be determined who was saying what. In addition, this caused network traffic to increase beyond what was actually necessary. In conventional network games, there was also the problem that, even in the case of voice chat being exchanged between players, it was not possible to know who was chatting with whom, since there was no change in the display on the game screen. In addition, conventionally, the output volume of voice chat was set at a fixed level, regardless of the position of the characters within the game screen, so there was an unnatural feeling because the chatting of characters in the distance and characters in the foreground was all at the same volume level.

SUMMARY

An object of the present invention then is to present a voice chat system which solves the above-mentioned problems and achieves a satisfactory environment for voice chat without increasing the network load more than necessary.

To achieve the above object, the voice chat system of the present invention is a voice chat system having a plurality of client apparatuses connected via a communications network and a server apparatus connected to each of the plurality of client apparatuses, wherein each of the client apparatuses comprises: object setting means for setting in a virtual space a first object corresponding to the client apparatus and second objects corresponding to other client apparatuses; image generating means for generating an image for displaying on a screen the first and second objects set by the object setting means; inputting means for selecting a second object corresponding to a receiving party's client apparatus from the second objects displayed on the screen in response to the talking party's input; voice inputting means for inputting the talking party's voice information; and transmitting means for transmitting to the server apparatus via the communications network information identifying the second object selected by the inputting means and voice information inputted by the voice inputting means, and wherein the server apparatus comprises: receiving means for receiving from the client apparatus via the communications network the information identifying the second object and the voice information and transmitting means for transmitting the voice information to the client apparatus corresponding to the second object.

The voice chat system of the present invention is a voice chat system having a plurality of client apparatuses connected via a communications network and a server apparatus connected to each of the plurality of client apparatuses, wherein the server apparatus comprises registration means for making a registration for conducting voice chat between the client apparatuses; and registration information transmitting means for transmitting to each of the client apparatuses registration information on the registered client apparatus; and wherein each of the client apparatuses comprises: registration information receiving means for receiving registration information on another client apparatus sent from the server apparatus; voice inputting means for inputting a talking party's voice information; object setting means for setting in a virtual space a first object corresponding to the client apparatus and second objects corresponding to other client apparatuses based on the registration information; image generating means for generating an image for displaying on a screen the first and second objects set by the object setting means; inputting means for selecting, in response to a talking party's input, a second object corresponding to a receiving party's client apparatus from the second objects displayed on the screen; and voice information transmitting means for transmitting, in reference to the registration information, the voice information to the client apparatus corresponding to the second object selected by the inputting means.

Preferably, the second object selected by the inputting means is an individually specified single object or are two or more objects specified as a group.

The voice chat system of the present invention is a voice chat system having a plurality of client apparatuses connected via a communications network and a server apparatus connected to the plurality of client apparatuses, wherein each of the client apparatuses comprises: object setting means for setting in a virtual space a first object corresponding to the client apparatus and second objects corresponding to other client apparatuses; image generating means for generating an image for displaying the first and second objects set by the object setting means; inputting means for selecting, in response to a talking party's input, a plurality of second objects that each correspond to the client apparatuses of a plurality of receiving parties from the second objects displayed on the screen; voice inputting means for inputting a talking party's voice information, and transmitting means for transmitting to the server apparatus via the communications network information on a position of the first object, the voice information and information identifying the second objects selected by the inputting means in response to the talking party's input, and wherein the server apparatus comprises: receiving means for receiving from the client apparatus via the communications network the information on a position of the first object, the voice information and the information identifying the second objects selected by the inputting means in response to the talking party's input;

transmitting means for transmitting said voice information to the client apparatus corresponding to a second object separated from said first object by a distance smaller than a specified distance among said plurality of second objects selected by said inputting means and limiting transmission of said voice information to the client apparatus corresponding to a second object separated from said first object by said specified distance or a distance greater than said specified distance among said plurality of second objects selected by said inputting means.

The voice chat system of the present invention is a voice chat system having a plurality of client apparatuses connected via a communications network and a server apparatus connected to each of the plurality of client apparatuses, wherein the server apparatus comprises: registration means for making a registration for conducting voice chat between the client apparatuses; and registration information transmitting means for transmitting to each of the client apparatuses registration information on a registered client apparatus, and wherein each of the client apparatuses comprises: registration information receiving means for receiving registration information on another client apparatus sent from the server apparatus; voice inputting means for inputting a talking party's voice information; object setting means for setting in a virtual space a first object corresponding to the client apparatus, and a second object corresponding to another client apparatus based on the registration information; image generating means for generating an image for displaying on a screen the first and second objects set by the object setting means; inputting means for moving, in response to a talking party's input, the first object displayed on the screen within the virtual space; and voice information transmitting means for, when the distance between the first object and the second object in the virtual space is less than a specified distance, transmitting the voice information to the client apparatus corresponding to the second object in reference to the registration information and, when the distance is the same as or more than the specified distance, limiting the transmission of the voice information to the client apparatus corresponding to the second object.

The voice chat system of the present invention is a voice chat system having a plurality of client apparatuses connected via a communications network and a server apparatus connected to each of the plurality of client apparatuses, wherein each of the client apparatuses comprises: object setting means for setting in a virtual space a first object corresponding to the client apparatus and second objects corresponding to other client apparatuses; image generating means for generating an image for display on a screen the first and second objects set by the object setting means; inputting means for selecting, in response to a talking party's input, a plurality of second objects that each correspond to the client apparatuses of a plurality of receiving parties from the second objects displayed on the screen; voice inputting means for inputting the talking party's voice information; transmitting means for transmitting to the server apparatus via the communications network information on a position of the first object, the voice information and information identifying the second objects selected by the inputting means in response to the talking party's input, and wherein the server apparatus comprises: receiving means for receiving from the client apparatuses via the communications network the information on a position of the first object, the voice information and the information identifying the second objects selected by the input in the inputting means; and transmitting means for transmitting the voice information to the client apparatus corresponding to a second object in a higher rank than a specified rank when the second objects selected by the inputting means are ranked in order of shortest distance from the first object and limiting the transmission of the voice information to the client apparatus corresponding to a second object in the specified rank or in a rank lower than the specified rank.

The voice chat system of the present invention is a voice chat system having a plurality of client apparatuses connected via a communications network and a server apparatus connected to each of the plurality of client apparatuses, wherein the server apparatus comprises: registration means for making a registration for conducting voice chat between the client apparatuses; and registration information transmitting means for transmitting to each of the client apparatuses registration information on a registered client apparatus, and wherein each of the client apparatuses comprises: registration information receiving means for receiving registration information on another client apparatus sent from the server apparatus; voice inputting means for inputting a talking party's voice information; object setting means for setting in a virtual space a first object corresponding to the client apparatus and second objects corresponding to other client apparatuses based on the registration information; image generating means for generating an image for displaying on a screen the first and second objects set by the object setting means; inputting means for, in response to a talking party's input, moving in the virtual space the first object displayed on the screen; and voice information transmitting means for transmitting, in reference to the registration information, the voice information to the client apparatus corresponding to a second object in a higher rank than a specified rank when the second objects selected by the inputting means are ranked in order of shortest distance to the first object in a virtual space and limiting the transmission of the voice information to the client apparatus corresponding to a second object in the specified rank or in a lower rank than the specified rank.

The voice chat system of the present invention is a voice chat system having a plurality of client apparatuses connected via a communications network and a server apparatus connected to each of the plurality of client apparatuses, wherein the server apparatus comprises registration means for making a registration for conducting voice chat between the client apparatuses; and registration information transmitting means for transmitting registration information on a registered client apparatus to each of the client apparatuses; and wherein each of the client apparatuses comprises: registration information receiving means for receiving registration information on another client apparatus sent from the server apparatus; voice inputting means for inputting a talking party's voice information; storing means for storing their past chat history with another client apparatus; image generating means for generating a selection screen of chat partners recorded in the chat history; selecting means for selecting a chat partner from the selection screen; and voice information transmitting means for transmitting voice information inputted by the voice inputting means to the client apparatus of the chat partner selected by the selecting means.

The voice chat system of the present invention is a voice chat system having a plurality of client apparatuses connected via a communications network and a server apparatus connected to each of the plurality of client apparatuses, wherein the server apparatus comprises: registration means for making a registration for conducting voice chat between the client apparatuses; and registration information transmitting means for transmitting registration information on a registered client apparatus to each of the client apparatuses; and wherein each of the client apparatuses comprises: registration information receiving means for receiving registration information on another client apparatus sent from the server apparatus; voice inputting means for inputting a talking party's voice information; object setting means for setting in a virtual space a first object corresponding to the client apparatus and second objects corresponding to other client apparatuses based on the registration information; image generating means for generating an image for displaying on a screen the first and second objects set by the object setting means; inputting means for moving within the virtual space the first object displayed on the screen, in response to a talking party's input; and voice outputting means for outputting miscellaneous voices in the case where the client apparatus has not been specified by any other client apparatus as a partner for voice chat.

Preferably, each of the client apparatuses further comprises voice outputting means for outputting miscellaneous voices when the client apparatus has not been specified by any other client apparatus as a partner for voice chat.

Preferably, the image generating means generates an image wherein an object corresponding to the client apparatus of a player participating in voice chat, and an object corresponding to the client apparatus of a player not participating in the voice chat can be visually distinguished.

Preferably, the client apparatus comprises output volume adjustment means for adjusting the output volume of the voice information in accordance with the distance in the virtual space between an object corresponding to a talking party's client apparatus and an object corresponding to a receiving party's client apparatus.

The server apparatus of the present invention is a server apparatus for managing voice chat between a plurality of client apparatuses connected to a communications network, which comprises terminal identifying information obtaining means for obtaining terminal identifying information on the client apparatus of a receiving party specified by a talking party and transmitting means for transmitting voice data transmitted from the client apparatus of the talking party to a client apparatus identified by the terminal identifying information obtained by the terminal identifying information obtaining means.

Preferably, the client apparatus of the receiving party obtained by the terminal identifying information obtaining means is an individually specified single client apparatus or are two or more client apparatuses specified as a group.

Preferably, the receiving party is a party which has conducted voice chat with the talking party in the past.

Preferably, the receiving party is a party which operates a character positioned within a specified distance from the character operated by the talking party.

Preferably, the receiving party is a party which operates a character in a specified rank when characters are ranked in the order of shortest distance from the character operated by the talking party.

The client apparatus of the present invention is a client apparatus incorporating a function for conducting voice chat between a talking party and a receiving party via a communications network, which comprises image generating means for displaying on a display an image wherein the talking party and/or the receiving party participating in the voice chat, and a third party not participating in the voice chat are distinguished.

The client apparatus of the present invention is a client apparatus comprising sound volume adjustment means for adjusting output volume of the sound of chat voice in accordance with the distance between the characters each operated by a talking party and a receiving party which are participating in the voice chat.

The client apparatus of the present invention is a client apparatus incorporating a function for conducting voice chat between a talking party and a receiving party via a communications network, which comprises storing means for storing voice data of miscellaneous voices, and voice outputting means for, when the client apparatus has not been selected by any player as a chat partner, reading the voice data stored in the storing means and outputting the miscellaneous voices at low sound volume.

The client apparatus of the present invention is a client apparatus incorporating a function for conducting voice chat between a talking party and a receiving party via a communications network, which comprises selecting means for selecting one receiving party by an individual specification or two or more receiving parties by a group specification.

The client apparatus of the present invention is a client apparatus incorporating a function for conducting voice chat between a talking party and a receiving party via a communications network, which comprises a function for setting a party who has conducted voice chat in the past as a default receiving party.

The client apparatus of the present invention is a client apparatus incorporating a function for conducting voice chat between a talking party and a receiving party via a communications network, which comprises limiting means for limiting talking parties to parties which are operating characters positioned within a specified distance from the character operated by the talking party.

The client apparatus of the present invention is a client apparatus incorporating a function for conducting voice chat between a talking party and a receiving party via a communications network, which comprises limiting means for limiting receiving parties to parties which are operating characters within specified ranks when characters are ranked in the order of shortest distance from the character operated by the talking party.

The computer program of the present invention is one that causes a server apparatus for managing voice chat between a plurality of client apparatuses connected to a communications network, to perform a step of obtaining identifying information on the client apparatus of a receiving party specified by a talking party and a step of delivering voice data transmitted from the client apparatus of the receiving party specified by the talking party to a client apparatus specified by the identifying information obtained by the identifying information obtaining means.

Preferably, the client apparatus of the receiving party obtained by the identifying information obtaining means is an individually specified single client apparatus or two or more client apparatuses designated as a group.

Preferably, the receiving party is a party who has conducted voice chat with the talking party in the past.

Preferably, the receiving party is a party who is operating a character positioned within a specified distance from the character operated by the talking party.

Preferably, the receiving party is a party who is operating a character positioned in a specified rank when characters are ranked in the order of shortest distance from the character operated by the talking party.

The computer program of the present invention is one that causes a client apparatus incorporating a function that enables voice chat between a talking party and a receiving party via a communication network, to perform a step of displaying on a video monitor an image wherein a talking party and/or a receiving party participating in voice chat and a third party who is not participating in voice chat are distinguished.

The computer program of the present invention is one that causes a client apparatus incorporating a function that enables voice chat between a talking party and a receiving party via a communication network, to perform a step of adjusting the output volume of the chat sound volume in accordance with the distance between the characters each operated by the talking party and receiving party participating in the voice chat.

The computer program of the present invention is one that causes a client apparatus that incorporates a function that enables voice chat between a talking party and a receiving party via a communication network, to perform a step of outputting miscellaneous voices at low volume in the case where the client has not been selected by any player as a chat partner.

The computer program of the present invention is one that causes a client apparatus that incorporates a function that enables voice chat between a talking party and a receiving party via a communication network, to perform a step of selecting a receiving party by an individual specification or two or more receiving parties by a group specification.

The computer program of the present invention is one that causes a client apparatus that incorporates a function that enables voice chat between a talking party and a receiving party via a communication network, to perform a step of setting as a default receiving party a player who has conducted voice chat in the past.

The computer program of the present invention is one that causes a client apparatus that incorporates a function that enables voice chat between a talking party and a receiving party via a communication network, to perform a step of limiting the receiving parties to parties who are operating characters positioned within a specified distance from the character operated by the talking party.

The computer program of the present invention is one that causes a client apparatus that incorporates a function that enables voice chat between a talking party and a receiving party via a communication network, to perform a step of limiting the receiving parties to parties who are operating characters within specified ranks when characters are ranked in the order of shortest distance from the character operated by the talking party.

The storage medium of the present invention is a computer-readable storage medium in which the computer program of the present invention is stored. For this kind of computer-readable storage medium, portable storage media and the like can be used, for example, optical storage media (such as CD-RAM, CD-ROM, DVD-RAM, DVD-ROM, DVD-R, PD disk, MD disk, MO disk, and other such storage media which read out data optically), magnetic storage media (such as flexible disks, magnetic cards, magnetic tapes and other such media which read out data magnetically), memory cartridges equipped with memory elements (such as semiconductor memory elements like DRAMs, etc., or ferroelectric elements like FRAMs, etc.).

In addition, "on-demand" delivery of the computer program of the present invention is also possible from a network server apparatus, such as a Web server apparatus, in response to a request from a client apparatus connected to an open network such as an Internet network or a packet communication network, etc. (The client apparatus could be a personal computer, a game apparatus, or a portable information terminal such as a web-browser equipped portable telephone, PDA, or Palm-type PC, etc.).

PREFERRED EMBODIMENTS

First Embodiment

The first embodiment of the present invention is described below, referring to the Figures.

Figure 1:
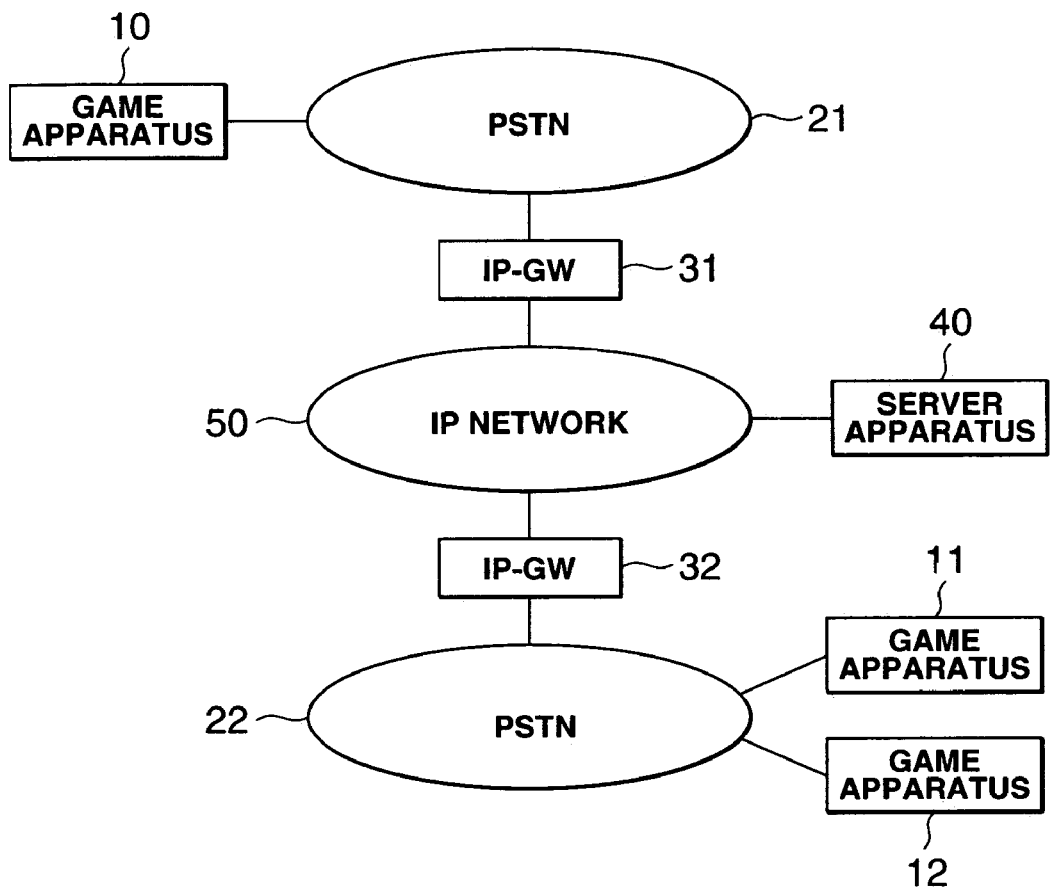
FIG. 1 is a network connection configuration drawing of a game apparatus and a server apparatus.

FIG. 1 is a network connection configuration drawing that includes a game apparatus and a server apparatus. In the following description, the explanation assumes Voice over IP as the voice signal transmission protocol, but Voice over FR, Voice over ATM, etc., are also possible. For Voice over IP network connection configurations, there are various forms, such as (1) Circuit switching net—gateway—IP network net—gateway—circuit switching net, (2) IP network access net—IP network net—IP network access net, (3) IP network access net—IP network net—gateway—circuit switching net, (4) circuit switching net—gateway—IP network net—IP network access net, and the like. The connection configuration of (1) is described below as an example.

In the same figure, 10, 11 and 12 are the game apparatuses (client apparatuses) operated by players A, B, and C, respectively; 21 and 22 are Public Switched Telephone Networks (PSTN); 31 and 32 are VoIP Gateways (IP Telephony Gateways); 40 is a server apparatus; and 50 is an IP network. In this embodiment, voice chat between game apparatuses connected to a network node are controlled by server apparatus 40. Game apparatuses 10, 11, and 12 each access server apparatus 40 using its respective global IP address given by the DHCP server apparatus (not shown), and executes network games. Data communication between game apparatuses 10, 11, and 12 and server apparatus 40 conforms to TCP/IP which is suited to open networks. On PTSN's 21 and 22, the players' voice signals are transmitted as analog signals, while at VoIP Gateways 31 and 32, switching from analog voice signals to IP packets and switching from IP packets to voice signals are performed.

Figure 2:
FIG. 2 is the VoIP packet format.

As shown in FIG. 2, switching from analog voice signals to IP packets is done by sampling the analog voice signal of 300 Hz to 3300 Hz at 8 kHz, and adding an RTP header (12 bytes), a UDP header (8 bytes), and an IP header (20 bytes) to a payload band-compressed to 32 kbps or 5.6 kbps by means of the ADPCM method or CELP method. In the present specification, when it is necessary to distinguish an IP packet that stores voice data in its payload from another IP packet, the former is called "VoIP packet," but in cases where no such distinction is required, the packets are called "IP packets" and this term is intended to include VoIP packets. In IP network 50, routers exist at numerous points, and IP packets are transmitted to destination addresses, relayed by the routers.

Figure 3:
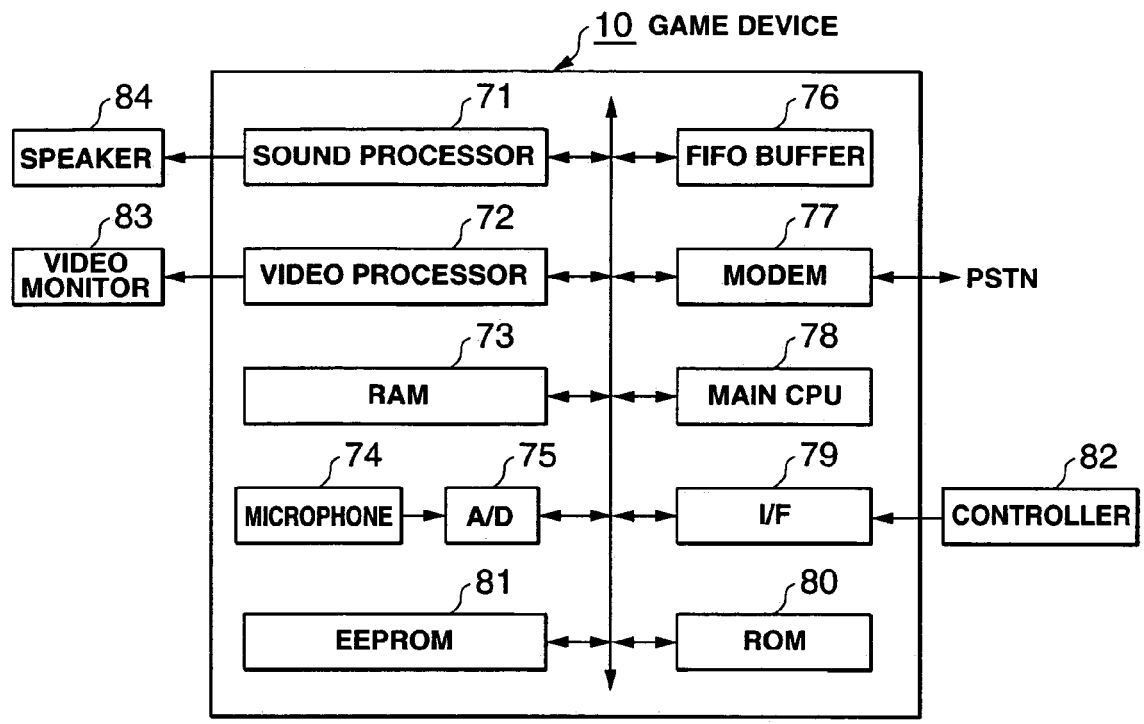
FIG. 3 is a functional block diagram of the game apparatus.

FIG. 3 is a block diagram of a hardware configuration of the game apparatus. Game apparatus 10 is provided with sound processor 71, video processor 72, RAM 73, microphone 74, A/D converter 75, FIFO buffer 76, modem 77, main CPU 78, peripheral interface 79, ROM 80, and EEPROM 81. Main CPU 78 reads a network game program from ROM 80 upon the start-up of the system, and loads it onto RAM 73. Main CPU 78 obtains player operating signals inputted from controller (inputting means) 80 via peripheral interface 79 and performs game processing. Main CPU 78 issues to video processor 72 the commands necessary for the generation of images to be formed in the virtual 3-dimensional space, and issues to sound processor 71 the commands necessary for generation of BGM and various sound effects. Video processor 72 generates and outputs the video signals for displaying an object on video monitor 83.

Figure 6:
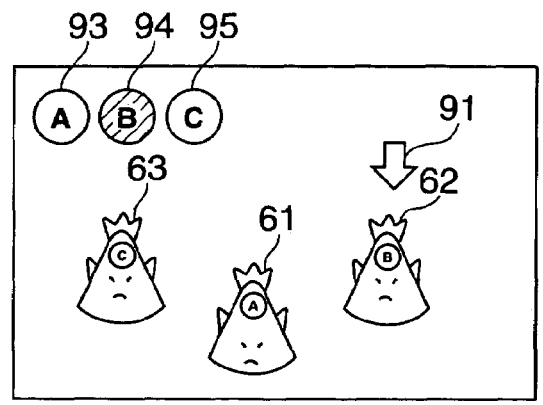
FIG. 6 is an example of a game screen.
Figure 7:
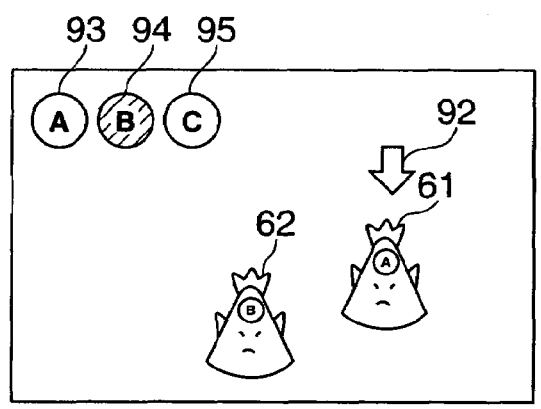
FIG. 7 is an example of a game screen.
Figure 8:
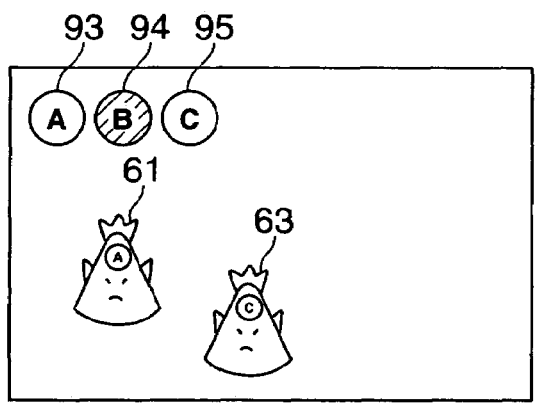
FIG. 8 is an example of a game screen.

As shown in reference numerals 61 through 63 in FIGS. 6 through 8, this object is a virtual character for a player to conduct voice chat with an opponent of the game while viewing video monitor 83. Objects 61 through 63 each correspond to each game apparatus. For example, object 61 corresponds to game apparatus 10 operated by player A, object 62 corresponds to game apparatus 11 operated by player B, and object 63 corresponds to game apparatus 12 operated by player C. The players conduct voice chat via these objects 61 through 63 displayed on the video monitor.

Main CPU 78 calculates positions (coordinates), travel distance or speed, etc. of objects 61 through 63 in a virtual space in accordance with an input by controller 80, and more preferably, functions as object setting means for setting an image to be displayed so that a talking party and a receiving party can be distinguished. Video processor 72 functions as image generating means for generating an image to be displayed on a video monitor. Modem 77 is transmitting and receiving means for modulating and demodulating various data (non-voice information) or voice information, which are required for network games and voice chat between PTSNs 21 and 22 and game apparatus 10. Voice information sent from server apparatus 40 via PTSNs 21 and 22 is stored in FIFO buffer 76 through modem 77. Sound processor 71 comprises a scheduling function, and reads voice information sequentially in the order stored in FIFO buffer 76 and generates a voice signal and output it from speaker 84. This enables smooth conversations by voice chat, as a plurality of voice sounds are not outputted simultaneously even in the case where voice information is sent from a plurality of game apparatuses via server apparatus 40.

A player's voice inputted through microphone (voice inputting means) 74, after conversion to a digital signal by A/D converter 75, is modulated by modem 77 and sent to PTSNs 21 and 22 in the direction of server apparatus 40. In chat history, information for identifying the client apparatus of a chat partner who has conducted voice chat in the past (e.g. user registration number for participating in a game, or global IP address), the length of previous chat time, the number of previous chat times, etc. are recorded. In place of EEPROM 81, chat history may be previously recorded in a volatile memory and backed up with a battery, etc.

Figure 4:
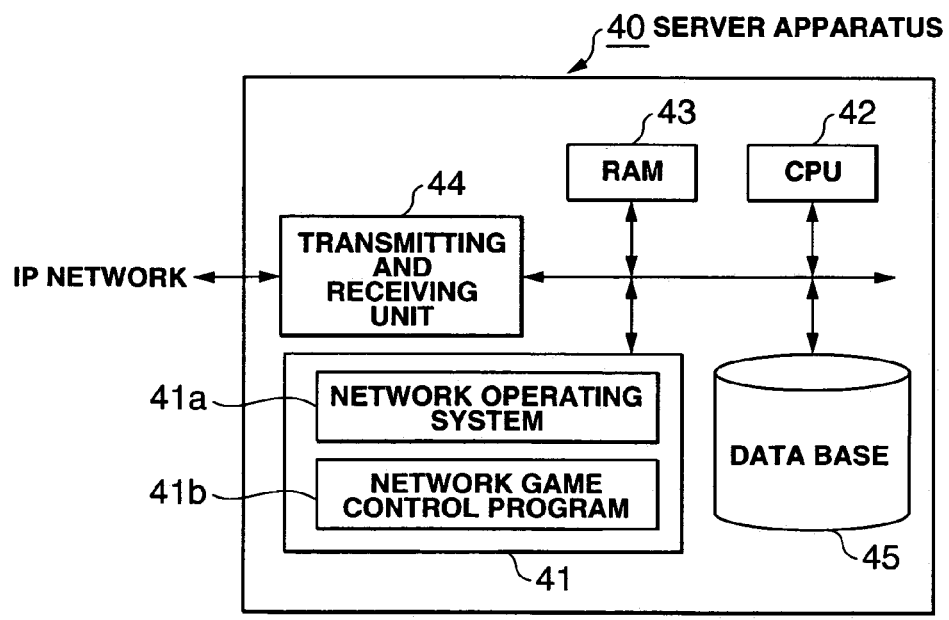
FIG. 4 is a functional block diagram of the server apparatus.

FIG. 4 is a block diagram of a hardware configuration of a server apparatus. Server apparatus 40 is provided with ROM 41, CPU 42, RAM 43 and transmitting and receiving unit 44 and database 45. ROM 41 is mounted with network operating system 41a and network game control program 41b. CPU 42 loads network game control program 41b into RAM 43 and performs the program under the operation environment of network operating system 41a, and thereby network game control and voice chat control of game apparatuses 10, 11 and 12 are performed. Server apparatus 40 is connected to all game apparatuses 10, 11 and 12 participating in a network game, and obtains operation input information inputted by a player in game apparatuses 10, 11 and 12 during the playing of a game and voice information inputted at the time of voice chat, and so forth, and performs network game control and voice chat control. In other words, game apparatuses 10, 11 and 12 perform network games and voice chats via server apparatus 40.

Data transmission and reception between game apparatuses 10, 11 and 12 and server apparatus 40 are performed via transmitting and receiving unit 44. Transmitting and receiving unit 44 transmits and receives data in the form of an IP packet. For example, voice information, among the information sent from game apparatuses 10, 11 and 12 to server apparatus 40, is converted into VoIP packet in VoIP gateways 31 and 32, while non-voice information is converted into an IP packet. Further, voice information, among the information sent from server apparatus 40 to game apparatuses 10, 11 and 12, is converted into VoIP packet in VoIP gateways 31 and 32, while various data and commands necessary for network game control are converted into IP packets. In database (registration means) 45, terminal identifying information (global IP address, MAC address, port number, etc.) of game apparatuses 10, 11 and 12 participating in a network game, and personal data of players, are registered. When a global IP address is used as terminal identifying information, an IP address automatically assigned by a DHCP server apparatus is included.

Personal data includes age, sex, vocal sound information and object information on a player, and so forth. Vocal sound information is the information not for sending a player's natural voice in voice chat to its chat partner, but showing which voice tone was selected in the case where voice sound, the tone (high voice, low voice, etc.) of which is changed by voice signal conversion process, is sent to the chat partner. It is also possible that a natural voice is converted in accordance with a voice of a celebrity or a voice originally prepared. Object information is various information to specify the types, forms, colors, sizes, etc. of the above-mentioned objects 61 through 63. When voice chat is performed between game apparatuses 10, 11 and 12, terminal identifying information for identifying a receiving party's game apparatus, and voice information, which has been changed to a VoIP packet, are sent from a talking party's game apparatus to server apparatus 40. Server apparatus 40 refers to database 45, performs desired process, etc., of voice information included in the VoIP packet as necessary, and sends the VoIP packet to the game apparatus of a receiving party specified by terminal identifying information.

Figure 5:
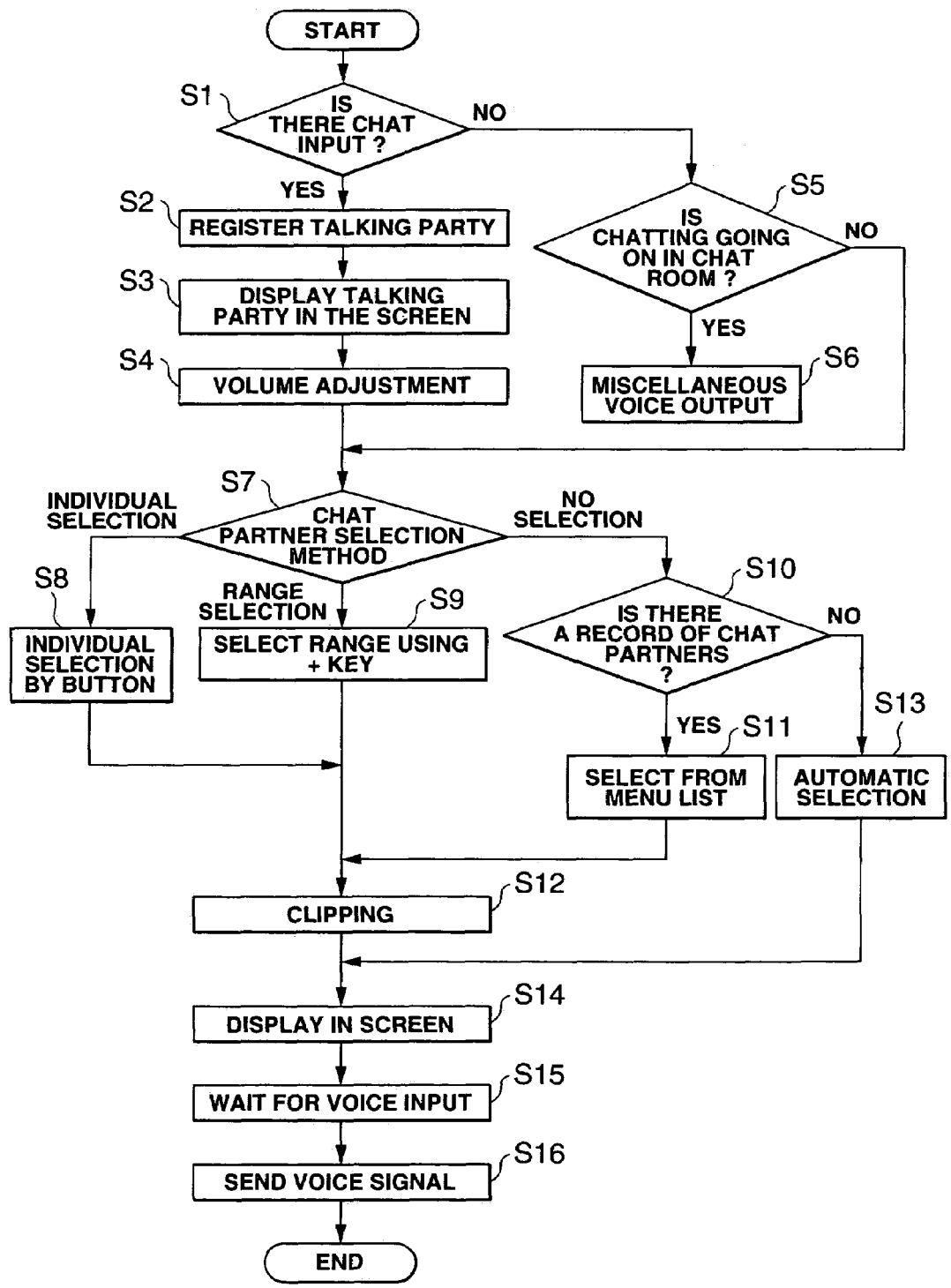
FIG. 5 is an explanatory diagram of the voice chat processing in the game apparatus.

FIG. 5 is a flow chart describing the steps of voice chat processing. As described above, voice chat between game apparatuses 10, 11 and 12 are performed through server apparatus 40. A talking party accesses server apparatus 40 upon designating a receiving party, and sends voice information to server apparatus 40. A receiving party is specified by selecting the above objects 61 through 63. For example, assuming that player B, as a talking party, talks to player A, player B selected object 61, thereby determining player A as a receiving party. Information that player B has selected player A as a chat partner is sent from game apparatus 10 to server apparatus 40. Voice information inputted by Player B to game apparatus 11 through microphone 74 is then sent to game apparatus 10 via server apparatus 40. Server apparatus 40 that received the voice information sends a chat input interrupt signal to notify the receiving party that there is an interruption of chat. By receiving the chat input interrupt signal, the game apparatus can detect that it is selected as a chat partner. In reference to an example case where voice chat is performed between player B (talking party) and party A (receiving party), processing steps shown in the flow chat in FIG. 5 are described in detail as follows.

Game apparatus 10 detects a chat input interrupt signal from server apparatus 40 (step S1), writes terminal identifying information on game apparatus 11 into EEPROM 81 as chat history (step S2), and displays object 62 corresponding to game apparatus 11 on the video monitor (step S3). Objects displayed on the video monitor this time are shown in FIGS. 6 through 8. FIG. 6 shows a game screen to be displayed on player As video monitor, and 61, 62, and 63 are objects operated by players A, B and C, respectively. As described above, voice chat between players A, B and C is performed through the objects 61, 62 and 63 displayed on the video monitor. Following is an example of a case whereby chatting is done with player B. as the talking party, and player A, as the receiving party. To distinguish player B's object 62 (the talking party) from other objects 61 and 63 on the game screen of player A (the receiving party), a downward pointing arrow 91 is affixed in a position above the head of object 62. In this way, by distinguishing the talking party's character from the other characters as they are displayed in the game screen of the receiving party, it becomes possible for the receiving party to grasp visually who it is who has started to talk to him.

FIG. 7 is the game screen displayed on the video monitor of player B, the talking party. In the same game screen, an arrow 92 is affixed to object 61 of the receiving party thus providing means to enable grasping visually who it is that is being spoken to. FIG. 8 is the game screen displayed on the video monitor of player C who is not participating in the voice chat. Because it is not necessary for player C who is not participating in the voice chat to grasp who is the talking party and who is the receiving party, the above-mentioned arrows 91 and 92 are not displayed.

As long as it is something that can indicate a distinction in the game screen as to who is the talking party, means can be used other than affixing arrow 91 to character 62 as described above. As shown in the same diagram, icons 93, 94, 95, which represent each of the players, can be shown, and who the talking party is can be suggested by distinguishing the display appearance of icon 94 of player B, the talking party, from the display appearance of the other icons. As examples of ways of changing the icon's display appearance, the color (including brightness and chroma), shape, size or position can be changed. For the icons, photographs of the players' faces taken with a digital camera or the like may be used. The icon display approach has the merit that, even if a character is clipped due to camera work and does not appear in a game screen, who the talking party is can still be definitely indicated.

Figure 9:
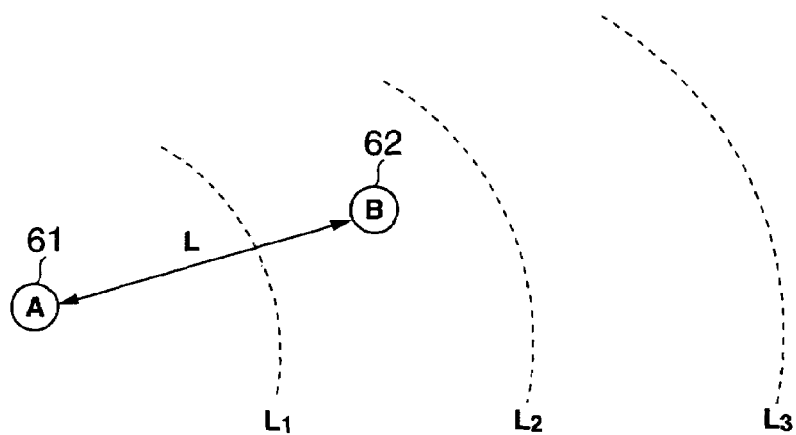
FIG. 9 is an explanatory diagram of voice chat.
Figure 10:
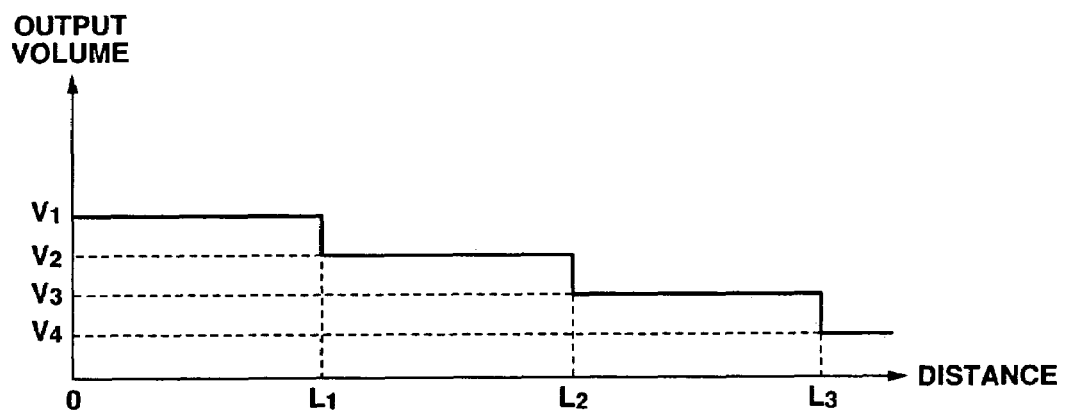
FIG. 10 is an explanatory diagram of voice chat output volume.
Figure 11:
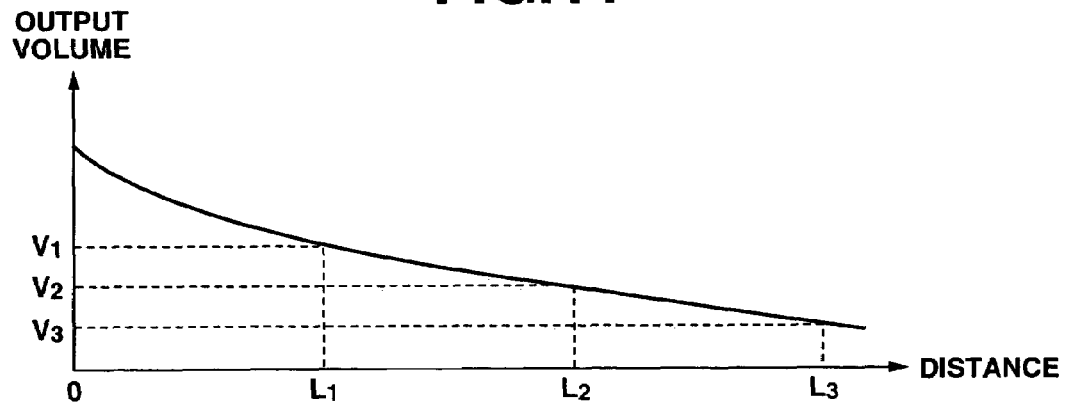
FIG. 11 is an explanatory diagram of voice chat output volume.

Here, turning back to FIG. 5, processes in step 4 and thereafter are explained. In step S4, server apparatus 40 adjusts output volume of voice chat in accordance with the distance in a virtual space between object 61 and object 62. FIGS. 9 through 11 are illustrations of changing output volume of chat voice in accordance with the distance in a virtual space between object 61 and object 62. In FIG. 10, output volume is $V_1$ in the case where the distance L, between object 61 and object 62, is less than $L_1$; output volume is $V_2$ when the distance L is equal to or greater than $L_1$ but less than $L_2$; output volume is $V_3$ when the distance L is equal to or greater than $L_2$ but less than $L_3$; and output volume is $V_4$ when the distance L is greater than or equal to $L_3$. In this way, by adjusting the output volume of the voice chat to reflect the positional relationship of the characters displayed in the game screen, a virtual experience can be enjoyed, just as though one were actually talking with the characters.

Upon conducting voice chat, game apparatuses 10, 11 and 12 calculate coordinates of objects 61, 62 and 63 corresponding to the game apparatuses, respectively, and send them to server apparatus 40 as coordinate information of the objects. Server apparatus 40 calculates the distance between the objects from the differences in the coordinates of the objects, and adjusts output volume of voice chat. For example, when voice chat is conducted between player A and player B, server apparatus 40 calculates the distance in a virtual space between object 61 and 62 and determines output volume of chat voice in relation to the distance. In the above example, the case where output volume is changed for each predetermined distance is indicated; however, not limited to this, for example, the change of output volume level per unit distance can be determined in accordance with a medium conveying a voice signal (air, water, etc.). In the example of FIG. 10, output volume was made to change in steps, but as shown in FIG. 11 it is also acceptable to cause output volume to decrease continuously in relation to distance.

On the other hand, in the case where a chat input interrupt signal is not detected (step S1; NO), a check is made as to whether or not chatting is being exchanged in the chat room (step S5). Chat room means a virtual space prepared for players to chat in a network game. In the case where chatting is being exchanged by any of the players in the chat room (step S5; YES), miscellaneous voices stored ahead of time in ROM 80 are outputted (step S6). These miscellaneous voices are sounds at a low volume so that one gets the feeling that some people are carrying on a conversation in the distance in low voices. In this way, a player can grasp the fact that chatting is being exchanged by any of the players in the chat room. In the case where miscellaneous voices are previously outputted, which is not limited to the case in which voice data stored in ROM 80 is read and outputted, miscellaneous voices can be generated in software and outputted. In the case where chatting is not occurring in the chat room (step S5; NO), the system transits to step S7.

In step S7, selection of the chat partner is done by key operation by players. Methods of selection are: "individual selection," "range selection," and "no selection." In selecting a chat partner by "individual selection," its object is individually specified by moving a cursor (not shown), displayed in the game screen, through key operation of controller 82 (step S8). It is possible to specify a plurality of chat partners. In selecting a chat partner by "range selection," a certain range within the game screen is specified while holding down the + key of controller 82 and thus all chat partners included in that range are selected (step S9). In the case where neither "individual selection" or "range selection" is selected, if there is chat history recorded in EEPROM 81 (step S10; YES), a list of chat partners from the history of past chat exchanges is displayed as a menu window in the game screen and selection is made by specifying players from among those listed (step S11). From those in the menu window, a player can specify a group of several chat partners, or can specify an individual. In addition, the list displayed in the menu window can be classified into talking parties (players who have initiated conversations with player A) or receiving parties (players with whom player A has initiated conversations). Each list can be sorted in order of newest conversation, and from within the list, individual specification or comprehensive group specification can be done. Chat partner selection information is sent to server apparatus 40.

Figure 12:
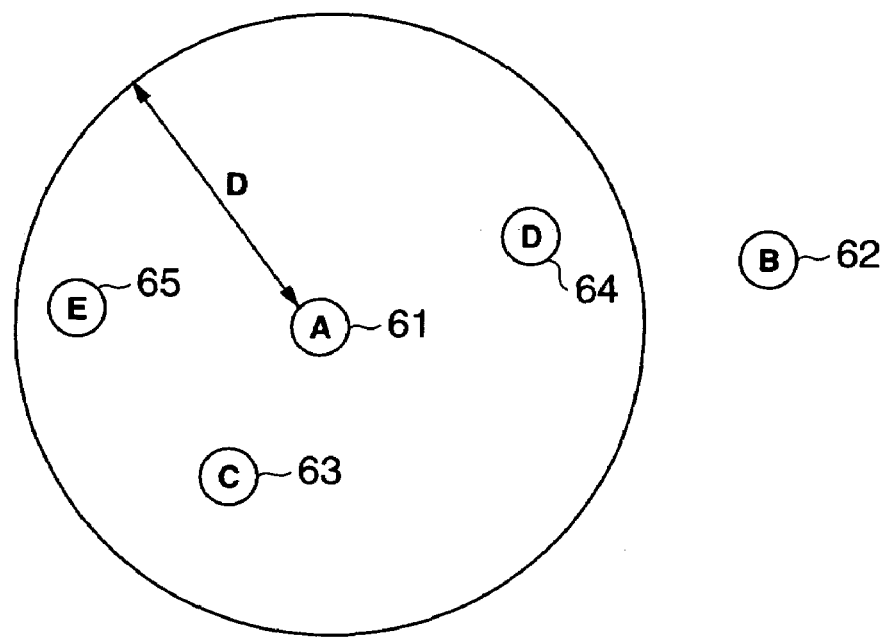
FIG. 12 is an, explanatory diagram of voice chat.
Figure 13:
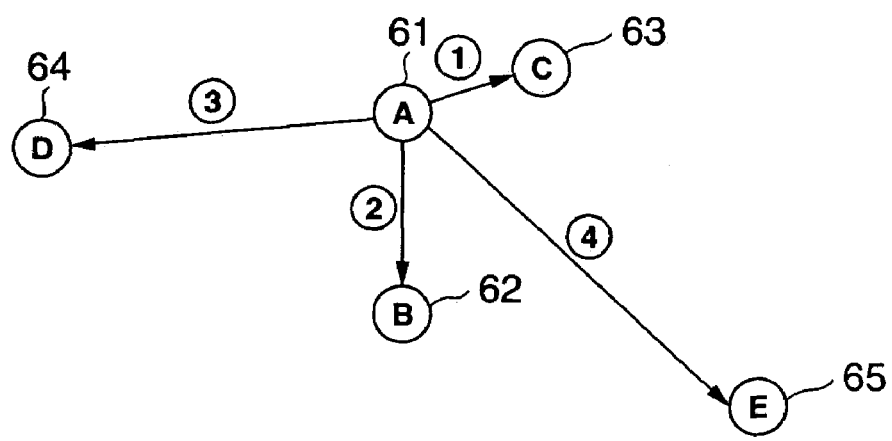
FIG. 13 is an explanatory diagram of voice chat.

When chat partner specification is completed through the above steps S8, S9 and S11, information to identify chat partners is sent to server apparatus 40 from game apparatuses 10, 11 and 12. Server apparatus 40, upon receiving the information, performs "clipping" processing whereby game apparatuses corresponding to objects separated from object 61 by a specified distance are eliminated from the chat partners (step S12). For example, as shown in FIG. 12, object 62 is separated from character 61 by a distance equal to or greater than distance D, that is, a distance where the voice output level relative to player B has become too small, thus hindering chatting, so character 62 is removed from the list of possible chat partners. In addition, for example, as shown in FIG. 13, when numbers are assigned in order of nearest distance, if a character's ranking number exceeds a ranking specified ahead of time, that character can be removed from the list of possible chat partners. In the example of the same figure, the nearest to object 61 is character 63; second nearest is character 62; third nearest is character 64; and fourth nearest is character 65. If the fourth and subsequent characters are subject to "clipping," then character 65 will be removed from the list of possible chat partners.

If neither "individual selection" or "range selection" is selected and no history of chart partners is recorded (step S10; NO), game apparatuses 10, 11 and 12 automatically select, one of the following (step S13): characters located within a specified distance from object 61; characters located in specified positions in the ranking-in-order-of-nearness; or the character by whom conversation was initiated immediately before. Upon deciding on the chat partners, the chat partners are indicated in the video monitor (step S14), and the state becomes one of "waiting for voice input" (step S15). Upon voice being inputted, server apparatus 40 delivers VoIP packets to the game apparatuses of the chat partners specified by player A (step S16).

Volume adjustment in step S4 or clipping processing in step S12 may be performed not in server apparatus 40, but in game devices 10, 11 and 12.

As described above, according to the first embodiment, all voice information exchanged in voice chat is transmitted to each game apparatus via server apparatus 40, so that the loads of devices 10, 11 and 12 can be reduced. Therefore, even in the case where game devices 10, 11 and 12 that have a low processing power are used, it is possible to realize voice chat with no obstacle in conversations while performing a network game.

Second Embodiment

In the first embodiment, voice chat is controlled by server apparatus 40. However, when game apparatuses 10, 11 and 12 have a high processing power, voice chat can also be controlled between the game apparatuses bypassing server apparatus 40. In this second embodiment, voice information is transmitted and received autonomously between the game apparatuses bypassing server apparatus 40. In the following explanation the second embodiment is described, focusing on the points different from that of the first embodiment, and the parts not specifically described shall be the same as in the first embodiment. In the first embodiment, in which server apparatus 40 controls voice chat, it is sufficient that server apparatus 40 recognizes to which part of the network each game apparatus is connected, and therefore, it is unnecessary that each game apparatus recognizes a global IP address of another game apparatus. On the other hand, in the second embodiment, in which voice chat is controlled between game apparatuses, it is necessary that each game apparatus recognizes terminal identifying information on another apparatus connected to the network.

In FIG. 4, terminal identifying information on a game apparatus participating in a network game is stored in database 45. When a network game is started, server apparatus 40 identifies game apparatuses participating in a game from among those registered in database 45, and transmits terminal identifying information on such all game apparatuses participating in the network game to each of the game apparatuses. Terminal identifying information transmitted to a game apparatus is written in EEPROM 81. Thus, the game apparatuses connected to the network can mutually recognize terminal identifying information on other apparatuses, which enables conducting voice chat that bypasses server apparatus 40.

On a video monitor of the game apparatus, as shown in FIGS. 6 through 8, an object corresponding to the game apparatus is displayed. A player controls controller 82 to select an object corresponding to a chat partner. Main CPU 78 obtains from EEPROM 81 terminal identifying information on the game apparatus corresponding to the selected object, and transmits voice information inputted by microphone 74 to a game apparatus identified by the terminal identifying information.

Concurrently, information transmitted from server apparatus 40 to a game apparatus is not limited to terminal identifying information, but the player's personal data can also be included in such information. This enables a game apparatus to conduct voice chat by changing its voice tone, with the addition of personal data.

Further, it is also possible to change the output volume of chat voice in accordance with the distance of objects corresponding to a talking party and a receiving party, respectively. As a specific processing procedure, the processing step in step S4 of the first embodiment can be performed by the game apparatuses. Taking FIG. 9 for example, main CPU 78 of game apparatus 10 calculates the distance in a virtual space between object 61 and object 62, and determines the output volume of chat voice that should be outputted from speaker 84 in relation to this distance. A command outputted from main CPU 78 to sound processor 71 includes a command to specify the volume adjustment, and the output volume of the chat voice can also be changed flexibly. It is also possible that, as shown in FIG. 12, object 62, which is separated from object 61 by distance D or more, is previously set not to be a chat partner, and, as shown in FIG. 13 when numbers are assigned in order of nearest distance to object 61, if an object's ranking number exceeds a rank specified ahead of time, that object can be removed from the list of possible chat partners.

As in the first embodiment, it is also possible to store chat history in EEPROM 81, display on the game screen a list of chat partners based on the past chat history as a menu window, and select a chat partner from the list by the player's specification. If a game apparatus has not been selected by any player as a chat partner, miscellaneous voices stored in ROM 80 or generated in software may be outputted from speaker 84.

By means of the present invention, chat sounds are not outputted to all game apparatuses connected to the network, but chat sounds are outputted only to the game apparatuses specified by a player. As a result, network traffic is not increased what is actually necessary. In addition, the talking party, the receiving parties, and the third parties not participating in the chatting are distinguished and thus indicated in the game screen. Thus it is possible to grasp visually who is conversing with whom. In addition, because the output volume of the voice chat is adjusted according to the distance between the characters operated by the talking party and the receiving party, realistic voice chat can be achieved. By means of the present invention, voice chat partners can be limited to those within a specified distance or to those within specified positions in the ranking-in-order-of-nearness. Thus, the unnaturalness of voice chat with others separated from you by long distances in the virtual space is eliminated.

I claim:

1. A voice chat system having a plurality of client apparatuses connected to a communications network and a server apparatus connected to each of said plurality of client apparatuses, wherein said server apparatus comprises:
   registration means for making a registration for conducting voice chat between each of said plurality of client apparatuses; and
   registration information transmitting means for transmitting to each of said plurality of client apparatuses registration information for a registered client apparatus; and
   wherein each of said plurality of client apparatuses comprises:
   registration information receiving means for receiving registration information on another client apparatus sent from said server apparatus;
   voice inputting means for inputting a talking party's voice information;
   object setting means for setting in a virtual space a first object corresponding to a first one of the plurality of client apparatuses and a group of objects corresponding to the other of the plurality of client apparatuses based on the registration information;
   image generating means for generating an image for displaying on a screen said first object and said group of objects set by said object setting means;
   inputting means for selecting, in response to a talking party's input, a second object, which is an individually specified single object, corresponding to a receiving party's client apparatus and selected from said group of objects displayed on said screen, or two or more objects, which are specified as a group, corresponding to two or more receiving party's client apparatuses and selected from said group of objects;
   voice information transmitting means for transmitting, in reference to said registration information, said voice information to the receiving party's client apparatus corresponding to said second object selected by said inputting means or to the two or more receiving party's client apparatuses corresponding to said two or more objects selected by said inputting means; and
   voice outputting means for outputting miscellaneous voices when said client apparatus has not been specified by any other client apparatus as a partner for voice chat, wherein the miscellaneous voices are sounds at a low volume, creating an impression of multiple persons conversing at a distance.

2. The voice chat system of claim 1, wherein the miscellaneous voices are output using voice data that is stored in a read-only memory (ROM).

3. The voice chat system of claim 1, wherein the voice outputting means outputs the miscellaneous voices using software.

* * * * *